3,623,842
METHOD OF DETERMINING FLUID SATURA-
TIONS IN RESERVOIRS
Harry A. Deans, Houston, Tex., assignor to
Esso Research Company
Filed Dec. 29, 1969, Ser. No. 888,668
Int. Cl. E21b 47/00; G01n 33/24
U.S. Cl. 23—230 EP                    10 Claims

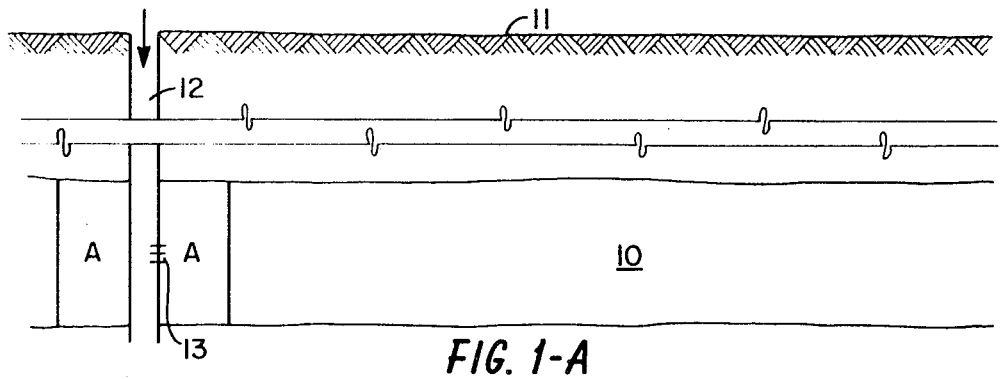
FIG. 1-A
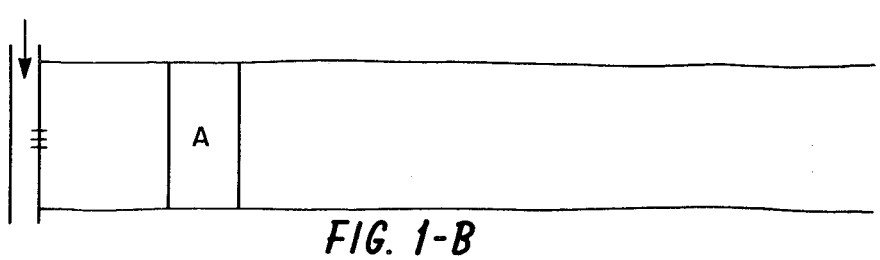
FIG. 1-B
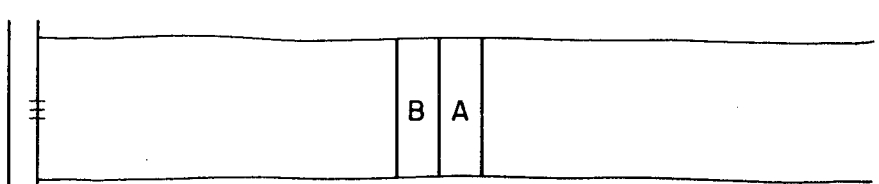
FIG. 1-C
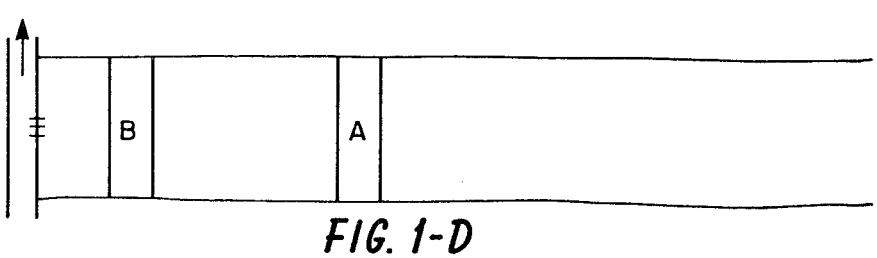
FIG. 1-D
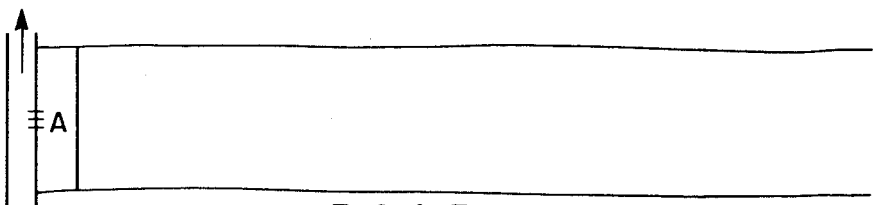
FIG. 1-E
INVENTOR.
HARRY A. DEANS
BY
Lewis H. Catherton
ATTORNEY United States Patent Office 3,623,842
Patented Nov. 30, 1971

ABSTRACT OF THE DISCLOSURE

A method for determining the relative amounts of fluid phases in a subterranean oil-bearing formation in which one of the phases is mobile and the other is essentially immobile. A carrier fluid-reactant solution is injected into the formation by means of a well. The carrier fluid is substantially insoluble in the immoble fluid and miscible with the mobile fluid. The reactant forms at least two tracers within the formation, one of which may be unconsumed reactant. The tracers have different partition coefficients between the carrier fluid and immobile phase. After measurable quantities of the two tracers are produced by the reactant, the carrier fluid-tracer solution is displaced through the formation to a point of detection which preferably is the injection well. By applying the principles of chromatography to measured chromatographic properties of the process, the fluid saturations of the formation can be determined.

BACKGROUND OF THE INVENTION (1) Field of the invention

This invention relates to a process utilizing a well or wells and includes the steps of testing or measuring formation fluids. More specifically, this invention relates to a method for determining fluid saturations in a subterranean reservoir penetrated by a well.

(2) Description of the prior art

A typical oil productive formation is a stratum of rock containing tiny interconnected pore spaces which are saturated with oil, water and gas. Knowledge of the relative amounts of these fluids in the formation is indispensable to proper and efficient production of the formation oil. For example, when a formation is first drilled it is necessary to know the original oil saturation to intelligently plan the future exploitation of the field. In tertiary recovery techniques, such as in solvent flooding, the quantity of oil present in the formation will often dictate the most efficient manner of conducting such an operation. The concentration of oil in the formation may indicate which of several alternative, tertiary recovery techniques might best be employed to produce the oil.

There are several methods which are currently used to obtain the fluid saturations of a formation. Coring is the most commonly used technique for acquiring this information. This is a direct sampling of the formation rock and liquids. For example, a small segment of the formation rock saturated with its fluids is cored from the formation and removed to the surface where its fluid content can be analyzed. This method, however, is susceptible to faults of the sampling technique; thus, the sample taken may, or may not, be representative of the formation as a whole. Also, there is a genuine possibility that the coring process itself may change the fluid saturation of the extracted core. Moreover, coring can only be employed in newly drilled wells or open hole completions. In the vast majority of wells, casing is set through the oil-bearing formation when the well is initially completed. Core samples, therefore, cannot subsequently be obtained from such a well. Finally, coring by its very nature only investigates the properties of the formation rock and fluids in the immediate vicinity of the wellbore.

Another approach for obtaining reservoir fluid saturations is by logging techniques. These techniques also investigate the formation rock and fluid properties for only a short distance beyond the wellbore. These techniques study the rock-fluid system as an entity; it is often difficult by this approach to differentiate between the properties of the rock and its fluids.

Material balance calculations based on production history are another approach to the problem. Estimates of fluid saturation acquired by this method are subject to even more variables than coring or logging. This technique requires a knowledge of the initial fluid saturation of the formation by some other method and knowledge of the source of the recovered fluids.

SUMMARY OF THE INVENTION

In accordance with the teachings of this invention the fluid saturations of the hydrocarbon-bearing formation containing a mobile fluid and an immobile fluid are determined by injecting a carrier fluid containing a reactant into the formation. The carrier fluid-reactant solution is permitted to remain at rest in the formation for a period of time. During this "soak period" at least a part of the reactant reacts to form a product. The reactant and product have differing partition coefficients between the carrier fluid and the immobile phase. Subsequently, the solution containing the carrier fluid, the unconsumed reactant and the product are displaced through the formation. Preferably the flow of the solution is reversed and it is produced through the injection well. Since the reactant and product have differeing partition coefficients between the carrier fluid and the immobile phase, they are chromatographically retarded in their passage through the formation by different amounts which are a function of the saturation of the immobile fluid phase. By detecting the presence of a reactant and product at the point of production an analyzing the results by chromatographic techniques, the relative proportions of mobile and immobile fluids in the formation can be determined.

Objects and features of the invention not apparent from the above discussion will become evident upon consideration of the following description of the invention taken in connection with the accompanying drawings.

BRIEF DESCRIPTION OF THE DRAWINGS

FIG. 1–A is a schematic representation of a cross section of the earth showing a subterranean formation penetrated by a well and showing the location of the carrier fluid-reactant solution after it is injected into the formation.

FIG. 1–B is a schematic representation of the formation and shows the displacement of the carrier fluid-reactant solution through the formation.

FIG. 1–C is a schematic representation of the formation and shows the formation of the product from the reactant during the soak period.

FIG. 1–D is a schematic representation of the formation and shows the relative positions of the product and reactant as they are produced from the formation.

FIG. 1–E is a schematic representation of the formation and shows the arrival of the reactant at the well after it has traversed the formation.

DESCRIPTION OF THE PREFERRED
EMBODIMENT

It will be apparent from this disclosure that the method of this invention has broad applicability. The method may be employed to determine the residual oil saturation in a waterflooded formation prior to tertiary oil recovery operations. The method may employ a single well for both injection and production. A single location in the well may be employed for injection and production, or the fluid may be injected at one location in the well and withdrawn from a second, vertically-spaced location in the well. The method may employ two wells in the formation, one for injection and one for production. For purposes of clarity, however, only one of the many uses of this invention—determination of the residual oil saturation in a watered-out reservoir using a single well—will be described in detail. The use of this method for other purposes will be readily apparent from this description.

FIG. 1-A shows a subterranean, oil-bearing formation 10 lying below the surface of the earth 11. The formation is penetrated by a well 12 which has been drilled from the surface. The well has been perforated at 13 to provide fluid communication between the interior of the well and the formation. The formation has an average thickness of 20 feet and an average porosity of approximately 30 percent. The formation water has a pH of approximately 7.1, and the formation temperature is approximately 160° F.

The portion of the formation being tested is watered-out. When well 12 was initially completed, the formation in the immediate vicinity of the well was oil productive. However, as oil was produced from well 12 and other wells higher in the formation, a strong natural water drive displaced the oil from the lower portions of the reservoir. At this point in time, no measurable quantities of oil are being produced from well 12. The reservoir pressure is above the bubble point of the oil and no free gas exists in the reservoir. To determine whether tertiary recovery techniques would be economical it is necessary to know how much oil remains in the watered-out portions of the formation. This oil saturation may be determined in the following manner.

A solution of reactant and carrier fluid is prepared at the surface. Brine previously produced from the formation is used as the carrier fluid. The reactant shown by the symbol A in the figures is an ester, ethyl acetate, which is added to the brine at a concentration of one percent by volume. One thousand barrels of the carrier fluid-ethyl acetate solution are injected into the formation at a rate of 850 barrels per day. The carrier liquid-ethyl acetate solution is displaced into the formation by injecting an additional 1,000 barrels of the brine at the same rate. The injection continues until the total volume of 2,000 barrels has been displaced into the formation. The total injection period is approximately 56 hours.

After the carrier fluid-ethyl acetate solution has been displaced into the formation as shown in FIG. 1-B, injection of the displacing brine is stopped and the solution permitted to soak for 11 days in the formation. During this soak period the ethyl acetate hydrolyzes to form two tracers; unreacted ethyl acetate and ethanol. The ethanol is represented by symbol B.

After the soak period the well is produced at a rate of 650 barrels a day and the produced fluids analyzed for the presence of unreacted ethyl acetate and ethanol. As shown in FIG. 1-D, the ethanol travels through the formation at a faster rate than the ethyl acetate. The ethyl acetate lags behind the ethanol because of its higher solubility in the formation oil.

In FIGS. 1-A through 1-E, the ester and alcohol are schematically represented as discrete slugs traversing the reservoir. It should be understood, however, that the leading and trailing edges of these slugs will not sharply and immediately change between zero and maximum tracer concentration. Due to the effects of dispersion and diffusion, the concentrations of the tracers as they pass a given point in the reservoir will slowly rise to a maximum value and then taper off.

As will be described in greater detail hereinafter, the relative fluid saturations of the reservoir can be determined from the quantities of fluid produced prior to the arrival of the tracer slugs at the point of detection. For example, the volumes of fluid produced from the formation prior to detection of each of the tracer slugs in the produced fluid can be conveniently employed. Also, the volumes of fluid produced prior to detection of the mid-point of each tracer slug can be used in a similar manner. The mid-point of the slugs can be readily approximated by selecting the produced volumes which correspond to the one-half maximum concentration points on the leading and trailing edges of the slug and averaging the two volumes. For example, the ethanol concentration in the previous example reached one-half its maximum value after the production of 364 barrels of fluid; it dropped to one-half its maximum value after the production of 1,158 barrels. Thus, the mid-point volume for the ethanol slug was 761 barrels. Similarly the ethyl acetate reached one-half maximum concentration after 827 barrels and fell to one-half its maximum after 2,196 barrels. The mid-point volume for the ester slug was therefore 1,511 barrels.

The fluid saturations of the formation can be determined from the results of the method using the principles of chromatography. Chromatography as applied to the flow of a substance through a porous medium is well known and has been extensively studied. See for example Raimondi and Tarcaso, "Mass Transfer Between Phases in a Porous Medium: A Study in Equilibrium," Society of Petroleum Engineers Journal, March 1965, page 51. The results of the method can be analyzed in a number of ways by applying these principles to measured physical properties. For example, the average arrival times of the ethanol and ethyl acetate at the producing well between the start of the production cycle and the detection of the substances may be employed. In a like manner the produced fluid volumes during the production cycle may be used. Any such physical property is measured between the start of the production cycle and the detection of the chemical substance at the producing well. Since such measured physical properties depend upon the relative chromatographic separation of the tracers, they will be collectively termed chromatographic properties herein for convenience and clarity.

Applying the principles of chromatography to the chromatographic quantity of mid-point volumes in the previously recited example, the following relationship is obtained:

Equation 1

$$\frac{S_o}{S_w} = \frac{V_E - V_A}{\frac{V_A}{K_E} - \frac{V_E}{K_A}}$$

where:

V is the volume of fluid produced from the formation between the start of the production cycle and the detection of the mid-point of a tracer slug at the producing wells, barrels.

K is the partition coefficient for a tracer between the carrier fluid and the oil expressed as the mass of the tracer per unit volume of carrier fluid divided by the mass of the tracer per unit volume of oil and measured at reservoir temperature.

S is saturation of a fluid expressed as a percent of total fluid volume of the formation.

Subscripts:
  A is alcohol
  E is ester
  $o$ is oil
  $w$ is water

In the example previously given, the partition coefficient for the ethanol between the formation oil and carrier brine at reservoir temperature is essentially infinite since the ethanol is substantially insoluble in the oil phase. The partition coefficient for the ethyl acetate is approximately 0.2. As previously stated, the average volume for the ethanol was 761 barrels. The average volume for the ethyl acetate was 1,511 barrels. Thus, from the relationship given above, it can be seen that the ratio of the oil saturation to the water saturation is 0.1965. Therefore, the oil saturation is approximately 16.4 percent and the water saturation is 85.6 percent.

In the example given an ester was hydrolyzed to produce two tracers, unreacted ester and alcohol, under nearly neutral conditions. The hydrolysis of ethyl acetate can be repersented by:

Equation 2

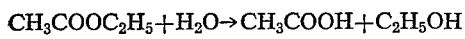

The hydrolysis reaction can vary depending upon reservoir conditions. For example, high temperature and high acidity or basicity will increase the reaction rate. Also, under strongly alkaline conditions the salt of the carboxylic acid will be formed rather than the acidic product. Nevertheless, the alcohol will always be a reaction product, and where the process is properly controlled some unreacted ester will be present as the second tracer. Where reservoir conditions are such that too little ester or alcohol would be present in the produced fluids under desired operating conditions, the injected fluids can be buffered to a pH level which will result in measurable and distinguishable quantities of the unreacted ester and alcohol.

Where the reaction rate is relatively slow and the injection-production period is relatively short compared to the soak period, the reaction occurring during the production and injection cycles can be ignored. Under these circumstances it can be assumed that the hydrolysis occurs only during the soak period. However, the reaction rates for the hydrolysis can be readily determined by simple laboratory analysis and the results corrected accordingly if such a refinement is necessary.

In the illustration given above, one of the formation fluids—oil—was essentially immobile. The saturation of the oil had been reduced to a point where its flow had stopped. When the saturation of any of the formation fluid (oil, gas or water) is below a given value, that liquid will not flow and only the other fluids can be produced from the formation. In the illustrated use of this method, the formation was watered-out and had no free gas and, although the formation contained appreciable quantities of oil, no oil or gas could be produced; only water would flow.

While it is essential to the practice of this invention that there be a mobile fluid, it should be understood that it is not necessary that the other fluid or fluids be immobile. However, analysis of the results becomes more complex when two fluids or more are flowing. In such a case it may be necessary to employ reservoir modeling techniques together with the principles of chromatography to satisfactorily analyze the results. Where only minor quantities of one or two are being produced, the simplified approach of Equation 1 is preferred. This method will be reasonably accurate so long as one of the fluids—i.e., the mobile fluid—is at least 90 percent of the total volume produced. This approach can be further refined by adjusting the average velocities of the tracers to account for flow of the "immobile" fluid.

The carrier fluid must be miscible with the mobile fluid and must be capable of solubilizing the reactant and tracers which it carries. Its solubility in the immobile fluids must be low enough that for practical purposes it can be considered insoluble in these fluids. The carrier fluid should be in the same state as the mobile fluid. Where formation water is the mobile liquid, produced formation water may be conveniently employed as the carrier liquid. As a practical matter, the mobile fluid previously produced from the formation is an excellent carrier fluid. In producing oil fields these fluids are readily available; since they are in fact the mobile fluid, there is no question of miscibility with the mobile fluid in the formation.

The reactant employed in the prior example was an ester which would undergo hydrolysis in the formation to produce an alcohol having a differing partition coefficient from the ester. It should be understood, however, that the practice of this invention is not limited to that specific ester or even the specific reaction illustrated. Many reactants will undergo a change in the formation to produce at least two tracers, unconsumed reactant-product or two products, which have differing partition coefficients between the carrier fluid and the immobile fluid phase. Routine laboratory analysis can be used to determine the suitability of such reactants in the practice of this invention.

The reactants and products, of course, must be soluble in the carrier fluid. Moreover, they must be sufficiently soluble that their concentrations in the injected carrier fluid will be at or above a minimum level. As a minimum, the concentrations of the reactant when injected must be great enough that the presence of the reactant and product in the carrier fluid can be detected when the fluid is produced from the formations. In determining the concentrations to be employed the effects of dispersion and diffusion should be considered, as well as the sensitivity of the detection means. Where the carrier fluid is a liquid, the reactant and products may be liquids, dissolved solids, dissolved gases or combinations. Reactants or products which will interact with or be strongly adsorbed by the formation rock, of course, should not be employed in the practice of this invention.

The partition coefficients which are used in the chromatographic analysis are ratios which describe the equilibrium distribution of a substance between phases. These ratios are also known as distribution coefficients and equilibrium ratios and can be determined by simple experimental procedures. Where only two phases exist in the reservoir, as in the prior example, a two-phase partition coefficient is determined for each tracer. Known quantities of the carrier fluid, the immobile fluid, and the tracer are combined and vigorously agitated to insure complete and uniform mixing of the three components. After the system has reached equilibrium at reservoir conditions and the carrier and immobile fluids have segregated, the concentration of the tracer in each of the fluid phases is determined. The ratio of these concentrations is the partition coefficient for that tracer in that fluid system. A more detailed description of one method of determining partition coefficients is given in the cited article by Raimondi and Torcaso.

The tracers must have different partition coefficients between the carrier fluid and the immobile phase or phases. Theoretically, any difference in partition coefficients would be satisfactory. As a practical matter, however, the partition coefficient of one of the materials should be at least twice as great as the other to clearly distinguish the arrival times of the two substances at the point of detection.

It is essential to the practice of this invention that the tracers traverse approximately the same portions of the reservoir. Any production method which will satisfy this condition may be satisfactorily employed.

The produced fluids can be analyzed for the presence of the tracers in any convenient manner. Conventional chemical analytical techniques can be employed to determine the presence and concentrations of the tracers.

The technique of this invention has been illustrated by a method where a single well is used for injection and production. However, it should be obvious that a single well is not necessary. The reactant can be injected through one well and withdrawn from another. The single well technique is preferred, however, since shorter injection-production times can generally be employed by this method.

It should also be understood that it is not necessary to the practice of this invention to inject a slug of carrier fluid-reactant solution and drive the slug with a displacing fluid such as brine. The carrier fluid-reactant solution may be displaced into the formation, permitted to react and then withdrawn without the use of a driving or displacing fluid. However, it is preferred to displace the carrier fluid-reactant solution with a driving fluid to give a sharp indication of the leading edge of the tracer slugs when they arrive at the point of detection.

The principle of the invention, a detailed description of one specific application of the principle, and the best mode in which it is contemplated to apply that principle have been described. It is to be understood that the foregoing is illustrative only and that other means and techniques can be employed without departing from the true scope of the invention defined in the following claims.

What is claimed is:

1. A method for determining the relative amounts of two fluid phases in a subterranean reservoir formation wherein one of the phases is mobile and the other is essentially immobile which comprises injecting into the formation a carrier fluid-reactant solution, said carrier fluid being substantially insoluble in the immobile fluid phase and miscible with the mobile fluid phase, said reactant being capable of forming within the formation at least two tracers which have different partition coefficients between the carrier fluid and the immobile fluid phase, the concentration of the reactant in the carrier fluid and the reactivity of the reactant being sufficiently great to enable detection of two of said tracers, displacing the carrier fluid-tracer solution formed within the formation through the formation, detecting said two tracers following such displacement, and measuring a chromatographic property related to one of said two tracers and a chromatographic property related to the other of said two tracers to determine the relative amounts of the two fluid phases in the formation.

2. A method as defined by claim 1 wherein the carrier fluid is a liquid.

3. A method as defined by claim 2 wherein the carrier fluid is aqueous.

4. A method as defined by claim 1 wherein the reactant is a hydrolyzable ester.

5. A method as defined by claim 4 wherein the tracers are unreacted ester and the alcohol formed by hydrolysis of the ester.

6. A method as defined by claim 5 wherein the tracers are unreacted ethyl acetate and ethanol.

7. A method as defined by claim 1 wherein the carrier fluid-reactant solution is injected at a location in a well and is withdrawn from the same location at the same well.

8. A method as defined by claim 1 wherein the carrier fluid-reactant solution is injected into the formation at one well and is withdrawn from the formation at a second well which is spaced from the first well.

9. A method of determining residual oil saturation in a subterranean oil-bearing formation in which formation water is mobile and the residual oil is immobile which comprises preparing a solution containing an aqueous phase and a reactant, said aqueous phase being miscible with the formation water and substantially insoluble in the residual oil, injecting the solution by means of a well into the formation, permitting the solution to remain in the formation until detectable quantities of unconsumed reactant and a reaction product have been formed, said unconsumed reactant and reaction product having different partition coefficients between the solution and the residual oil, withdrawing the solution containing the unconsumed reactant and said reaction product through the formation, detecting the presence of unconsumed reactant and said reaction product in the withdrawn solution, and measuring a chromatographic property related to said unconsumed reactant and a chromatographic property related to said reaction product to determine the residual oil saturation in the formation.

10. A method of determining the relative amounts of mobile and immobile fluid phases in a subterranean formation which comprises forming two tracers in a carrier fluid in the formation at a point which is spaced from a well, said tracers having different partition coefficients between the carrier fluid and the immobile fluid phase, displacing the carrier fluid-tracer solution through the formation and toward the well, detecting the presence of the tracers in the carrier fluid at the well, and measuring a chromatographic property related to one of said tracers and a chromatographic property related to the other of said tracers to determine the relative amounts of mobile and immobile fluid phases in the formation.

References Cited

UNITED STATES PATENTS

| | | | |
|---|---|---|---|
| 3,334,688 | 8/1967 | Blackwell et al. | 166—252 X |
| 3,372,746 | 3/1968 | Sanderson et al. | 23—230 EX X |

MORRIS O. WOLK, Primary Examiner

R. M. REESE, Assistant Examiner

U.S. Cl. X.R.

166—252